United States Patent
Tokunaga et al.

(10) Patent No.: US 8,810,959 B2
(45) Date of Patent: Aug. 19, 2014

(54) DISK DRIVE SPINDLE MOTOR WITH CORE SUPPORT HAVING ANGLED SLOPING PART OF DECREASED THICKNESS

(71) Applicant: Samsung Electro-Mechanics Japan Advanced Technology Co., Ltd., Shizuoka (JP)

(72) Inventors: Yusuke Tokunaga, Shizuoka (JP); Tomoya Takahashi, Shizuoka (JP); Kazuyoshi Nagai, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

(21) Appl. No.: 14/022,385

(22) Filed: Sep. 10, 2013

(65) Prior Publication Data

US 2014/0146416 A1    May 29, 2014

(30) Foreign Application Priority Data

Nov. 29, 2012  (JP) .................................. 2012-261265

(51) Int. Cl.
    *G11B 19/20*    (2006.01)
(52) U.S. Cl.
    CPC .................................. *G11B 19/2018* (2013.01)
    USPC ......................... 360/99.08; 310/67 R; 310/90
(58) Field of Classification Search
    CPC .......................... G11B 19/2018; G11B 19/2009
    USPC .......... 360/99.08, 98.07, 99.04; 310/67 R, 90
    See application file for complete search history.

(56) References Cited

U.S. PATENT DOCUMENTS

| | | |
|---|---|---|
| 2010/0195248 A1 | 8/2010 | Yamada et al. |
| 2011/0033143 A1 | 2/2011 | Yamada et al. |
| 2011/0051287 A1 | 3/2011 | Tokunaga |
| 2011/0064341 A1 | 3/2011 | Mizuno et al. |
| 2011/0176240 A1 | 7/2011 | Tashiro |
| 2011/0200279 A1 | 8/2011 | Goto |
| 2011/0255191 A1 | 10/2011 | Watanabe et al. |
| 2011/0279925 A1 | 11/2011 | Watanabe et al. |
| 2012/0033324 A1 | 2/2012 | Muramatsu et al. |
| 2012/0183243 A1 | 7/2012 | Sugiki |

FOREIGN PATENT DOCUMENTS

JP    2011-151882    8/2011

*Primary Examiner* — Craig A. Renner
(74) *Attorney, Agent, or Firm* — IPUSA, PLLC

(57) ABSTRACT

A rotating device includes a rotor including a hub to receive a recording disk, and a fixed body including a base that fixedly supports a bearing unit to rotatably support the rotor. The fixed body includes a core having a cylindrical part and salient poles extending in a radial direction, a ring-shaped member having a core holding part that has the core fixed to an outer peripheral surface thereof, a sloping part extending in a direction inclined with respect to a rotational axis of the rotor from a side of the core holding part farther away from the hub, and a support part extending from a side of the sloping part farther away from the hub.

14 Claims, 9 Drawing Sheets

DISK DRIVE SPINDLE MOTOR WITH CORE SUPPORT HAVING ANGLED SLOPING PART OF DECREASED THICKNESS

CROSS-REFERENCE TO RELATED APPLICATIONS

This application is based upon and claims the benefit of priority of Japanese Patent Application No. 2012-261265 filed on Nov. 29, 2012, the entire contents of which are incorporated herein by reference.

BACKGROUND OF THE INVENTION

1. Field of the Invention

The present invention relates to a rotating device having a rotor that is rotatably supported with respect to a fixed body.

2. Description of the Related Art

A disk drive, such as a hard disk drive, is an example of the rotating device. Size reduction and increase in storage capacity of the disk drive have led to a 2.5-inch disk drive with a storage capacity on the order of 2.0 TB. Due to this trend in the size reduction and the increase in the storage capacity of the disk drive, various electronic apparatuses are now equipped with the disk drive. Particularly a portable electronic apparatus, such as a lap-top personal computer, a digital video camera, and the like, are now equipped with the disk drive. For example, Japanese Laid-Open Patent Publication No. 2011-151882 proposes an example of a conventional disk drive.

Compared to the disk drive provided in a desk-top electronic apparatus, such as a desk-top personal computer, the disk drive provided in the portable electronic apparatus require improved shock resistance and vibration resistance, in order to withstand shock of a fall and vibration while the portable electronic apparatus is carried by a user.

Because large-capacity contents, such as high definition video clips, are becoming popular, there are demands to further increase the storage capacity of the disk drive. One technique of increasing the storage capacity of the disk drive sets a width of a recording track narrow, and sets a magnetic head close to a surface of a magnetic recording disk. However, when a gap between the magnetic head and the surface of the disk is narrow, the magnetic head may hit the disk when the shock or the like is applied to the disk drive. In addition, when the width of the recording track is narrow, tracing of the recording track by the magnetic head may be disturbed by the shock applied to the disk drive. These phenomena may generate a data read error and/or a data write error.

These phenomena are not limited to the disk drive, and may occur in other types of rotating devices that rotationally drive the disk.

SUMMARY OF THE INVENTION

Embodiments of the present invention may provide a rotating device that may reduce undesirable effects of shock and vibration.

According to one aspect of the present invention, a rotating device may include a rotor rotatable about a rotational axis and including a hub configured to receive a recording disk; and a fixed body, including a base that fixedly supports a bearing unit, configured to rotatably support the rotor via the bearing unit, wherein the fixed body includes a core having a cylindrical part and a plurality of salient poles extending in a radial direction from the cylindrical part; and a ring-shaped member having a core holding part that has an outer peripheral surface having the core fixed thereto, a sloping part extending in a direction inclined by a predetermined angle with respect to the rotational axis of the rotor from a side of the core holding part farther away from the hub, and a support part extending from a side of the sloping part farther away from the hub, wherein the rotor includes a magnet fixedly supported on a surface of the hub on a side of the salient poles, and wherein the sloping part has a thickness smaller than that of the core holding part.

Other objects and further features of the present invention may be apparent from the following detailed description when read in conjunction with the accompanying drawings.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE PREFERRED EMBODIMENTS

Figure 1A:
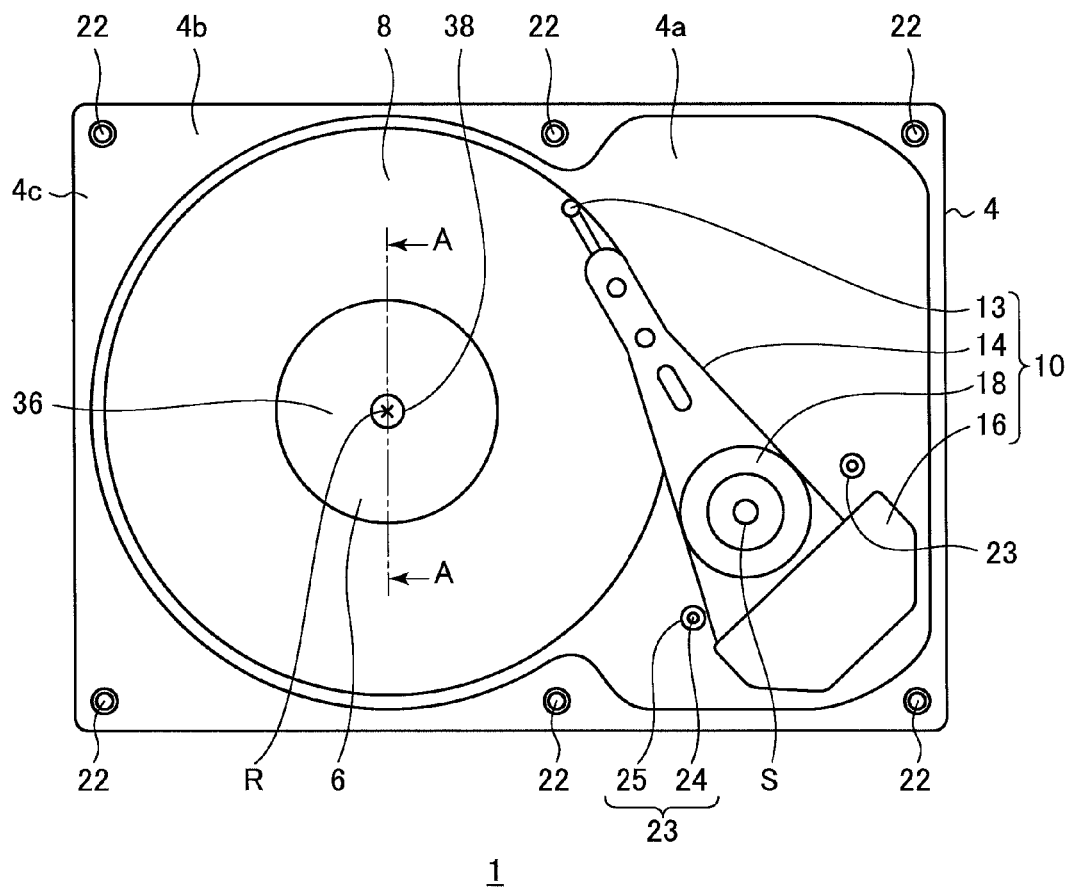
FIGS. 1A and 1B are a top view and a side view, respectively, illustrating a rotating device in one embodiment.

In each of the figures described hereunder, those elements and parts that are the same or substantially the same are designated by the same reference numerals, and a description thereof will not be repeated where appropriate. In addition, dimensions of the parts in each of the figures are enlarged or reduced, where appropriate, in order to facilitate understanding of the parts. Further, in each of the figures, illustration of some of the parts that may be considered unimportant in describing embodiments is omitted for the sake of convenience.

A rotating device in one embodiment may be suited for use in a disk drive, particularly in a hard disk drive that is equipped with a magnetic recording disk and rotationally drives the magnetic recording disk.

Embodiment

The rotating device in this embodiment may be summarized as follows.

For example, this rotating device may include a fixed body, and a rotor that is rotatably mounted on the fixed body via a support part (or support means). The rotor may include a mounting part (or mounting means) on which a medium to be driven, such as the magnetic recording disk, may be mounted. The support part may be provided with a radial support part (or radial support means) including a bearing that is rotatable relative to an axis. In addition, the support part may be provided with a thrust support part (or thrust support means) formed on one of the fixed body and the rotor. For example, the thrust support part may be located on an outer side of the radial support part along a radial direction of the radial support part. For example, the radial support part and the thrust support part may generate dynamic pressure in a lubricant medium. Furthermore, the rotating device may include a rotationally driving part (or rotationally driving means) that applies a torque on the rotor. This rotationally driving part may include a core, a coil, and a magnet.

A more detailed description will be given of the rotating device in this embodiment. The rotating device may include a thrust member that rotates integrally with a hub, and a sleeve that includes a flange part at an end part thereof on the side of the hub and projecting in the radial direction on the outer side. A part of the thrust member may rotate in a region facing a surface of the flange part on the side farther away from the hub. The sleeve may include a passage to flow a lubricant existing between the hub and the flange part into the region facing a surface of the thrust member on the side farther away from the hub. This passage is provided separately from a passage between the flange part and the thrust member. Accordingly, even in a case in which the thrust member becomes adjacent to the flange part due to a fall or the like of the rotating device, the passage may be secured to flow the lubricant existing between the hub and the flange part into the region facing the surface of the thrust member on the side farther away from the hub, and the pressure of the lubricant may be averaged.

Figure 1B:
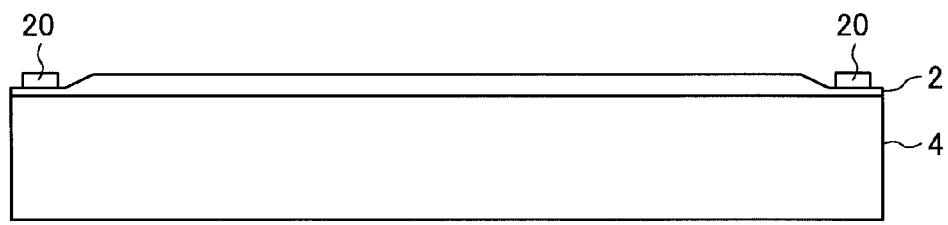

FIGS. 1A and 1B illustrate a rotating device 1 in this embodiment. FIG. 1A is a top view of the rotating device 1. FIG. 1A illustrates the rotating device 1 in a state in which a top cover 2 is removed, in order to illustrate a configuration inside the rotating device 1. FIG. 1B is a side view of the rotating device 1.

The rotating device 1 may include a fixed body, a rotor 6 rotatable with respect to the fixed body, a magnetic recording disk 8 mounted on the rotor 6, and a data read and write unit 10. The rotor 6 may include a clamper 36 and a disk fixing screw 38. The fixed body may include a base (or chassis) 4, projecting members 23 projecting from the base 4, a top cover 2, and six (6) screws 20.

In the following description, a side to which the rotor 6 is mounted with respect to the base 4 will be referred to as an upper side of the base 4.

The magnetic recording disk 8 may be a 2.5-inch magnetic recording disk having a glass substrate with a diameter of 65 mm. The magnetic recording disk 8 may have a center hole with a diameter of 20 mm, and have a thickness of 0.65 mm. The magnetic recording disk 8 may be placed on the rotor 6 and rotated together with the rotor 6. The rotor 6 may be rotatably mounted with respect to the base via a bearing unit 12 that is not illustrated in FIGS. 1A and 1B.

The clamper 36 may be crimped on an upper surface of the hub 28 (not illustrated in FIGS. 1A and 1B) by the disk fixing screw 38, and press the magnetic recording disk 8 against a disk setting surface of the hub 28.

As will be described later in conjunction with FIGS. 2A, 2B, and 2C, the base 4 may be formed by superposing or laminating two (2) base plates that are pressed from metal plates. For this reason, the base 4 may have an "embossed surface", meaning that a concavo-convex pattern in accordance with a pressing surface of a press mold may be formed on the surface of the base 4. The base 4 may include a bottom plate part 4a forming a bottom part of the rotating device 1, and an outer peripheral wall part 4b formed along an outer periphery of the bottom plate part 4a so as to surround a setting region for the magnetic recording disk 8. Six (6) screw holes 22 are provided in an upper surface 4c of the outer peripheral wall part 4b.

The data read and write unit 10 may include a recording and reproducing head 13, a swing arm 14, a voice coil motor 16, and a pivot assembly 18. The recording and reproducing head 13 may be mounted on a tip end part of the swing arm 14, and record data on the magnetic recording disk 8 and read (or reproduce) data from the magnetic recording disk 8. The pivot assembly 18 pivotally supports the swing arm 14 with respect to the base 4 so that the swing arm 14 may freely swing about a head rotational axis S as its center of rotation. The voice coil motor 16 may swing the swing arm 14 about the head rotational axis S as its center of rotation, and move the recording and reproducing head 13 to a desired position on an upper surface of the magnetic recording disk 8. The voice coil motor 16 and the pivot assembly 18 may be formed using a known technique to control the head position.

The projecting members 23 project from the bottom plate part 4a of the base 4. The base projecting member 23 may include a pin 24 to be fixed to the bottom plate part 4a of the base 4, and a damper 25 surrounding the pin 24. The pin 24 may be formed from a metal material such as stainless steel, for example. The damper 25 may be formed from a cushioning material such as a rubber material, for example. The projecting member 23 may be used as a crash stopper, for example. In this case, even if the swing arm 14 swings by an amount exceeding a designed range, the projecting member 23 may restrict the swing range of the swing arm 14 in order to prevent the swing arm 14 and the recording and reproducing head 13 from hitting the base 4 or the rotor 6. A method of fixing the pin 24 will be described later in conjunction with FIG. 4.

The top cover 2 may be fixed on the upper surface 4c of the outer peripheral wall part 4b of the base 4 using the six (6) screws 20. The six (6) screws 20 respectively correspond to the six (6) screw holes 22. Particularly the top cover 2 and the upper surface 4c of the outer peripheral wall part 4b are mutually fixed in order to prevent particle-containing air from leaking into a clean space inside of the rotating device 1 from a joining part between the top cover 2 and the upper surface 4c. A data read error and/or a data write error may easily be generated when particles of the particle-containing air adhere onto the magnetic recording disk 8 in the clean space, however, such errors may be suppressed by preventing the particle-containing air from leaking into the clean space.

Figure 2A:
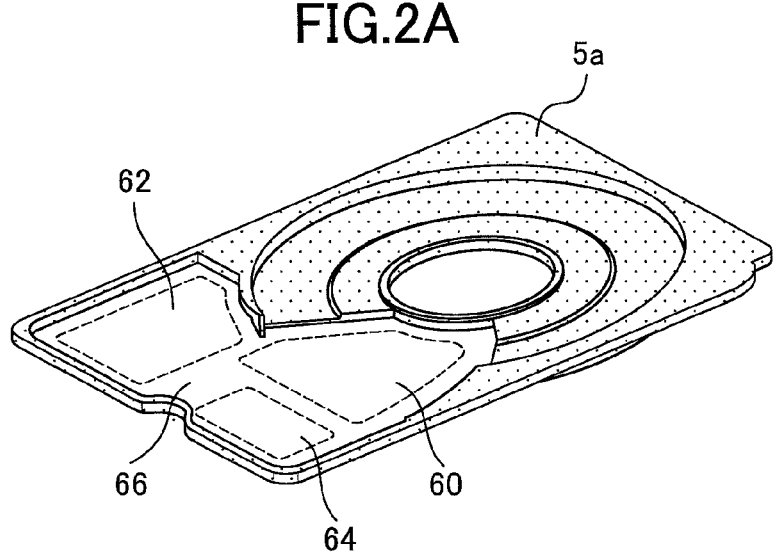
FIGS. 2A, 2B, and 2C are perspective views illustrating a first base plate forming a base, a second base plate forming the base, and the base formed by the first and second base plates, respectively.
Figure 2B:
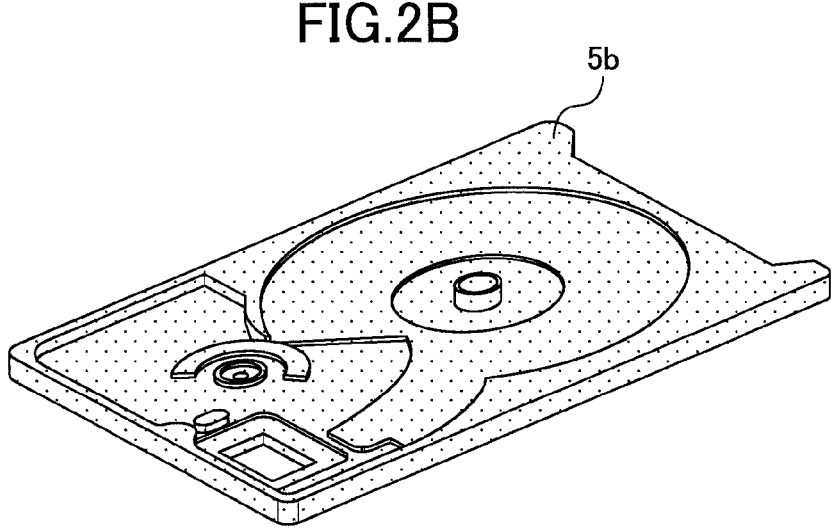
Figure 2C:
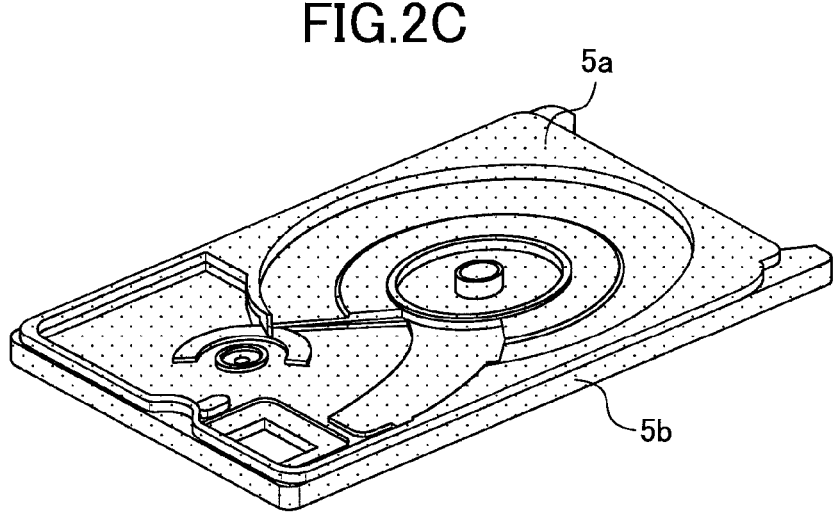

FIGS. 2A, 2B, and 2C respectively illustrate the base plates forming the base 4. FIG. 2A illustrates a first base plate 5a forming an upper half of the base 4, and FIG. 2B illustrates a second base plate 5b forming a lower half of the base 4. FIG. 2C illustrates the base 4 formed by the first base plate 5a and the second base plate 5b. The base 4 may be formed by bonding the first base plate 5a and the second base plate 5b by a hardening resin. By interposing the hardening resin between the first base plate 5a and the second base plate 5b, vibration may be absorbed by the hardening resin, and vibration of the base 4 and thus vibration of the entire rotating device 1 may be suppressed.

The first base plate 5a and the second base plate 5b may be formed by pressing metal plates. As a result of the pressing, an opening 66 may be provided in the first base plate 5a at a position corresponding to a swing range 60 of the swing arm 14 that supports the recording and reproducing head 13, a location 62 where the voice coil motor 16 is set, and a location 64 where a connector that connects the voice coil motor 16 and a control circuit board (not illustrated) is set, as illustrated in FIG. 2A. The swing range 60 and the locations 62 and 64 are indicated by dotted lines in FIG. 2A because the swing range 60 and the locations 62 and 64 may be provided on the second base plate 5b illustrated in FIG. 2B. For example, an aluminum plate, a steel plate, and the like may be used as the metal plate forming each of the first and second base plates 5a and 5b. The rotating device 1 may use the aluminum plate that is relatively light in weight as the metal plate forming each of the first and second base plates 5a and 5b. The first base plate 5a and the second base plate 5b may be formed from different materials.

In the rotating device 1, the base 4 formed by the pressed metal plates may be made relatively thin, by separately forming the first base plate 5a and the second base plate 5b. For this reason, parts such as the swing range 60, the location 62, and the location 64, or the opening 66 may be formed to dimensions with a relatively high accuracy, even by the pressing. Of course, the base 4 may be formed by cutting an aluminum die-cast part.

At least one of the first base plate 5a and the second base plate 5b may have a laminated (or stacked) structure made up of two or more layers, including metal sheets and a hardening resin interposed between the metal sheets. The hardening resin in the laminated structure may absorb vibration, and vibration of the base 4 and thus vibration of the entire rotating device 1 may be suppressed.

Figure 3A:
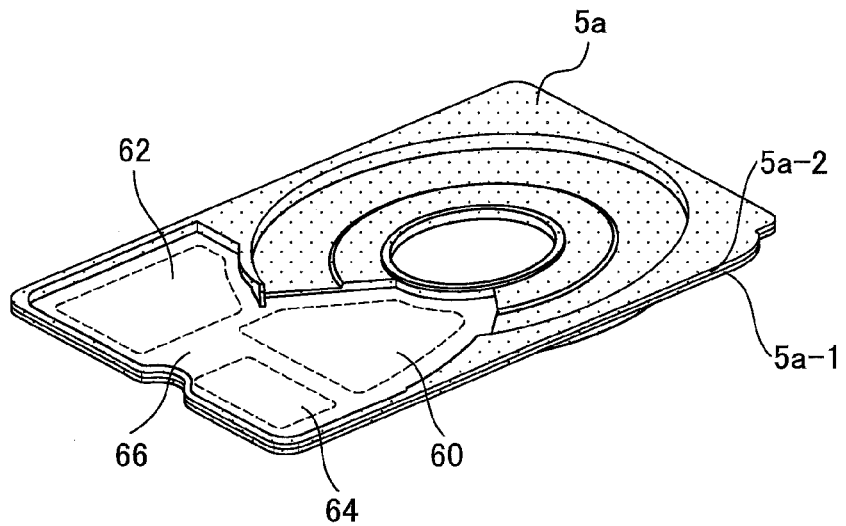
FIGS. 3A and 3B are perspective views illustrating the first base plate forming the base and having a laminated structure and the second base plate forming the base and having the laminated structure, respectively.
Figure 3B:
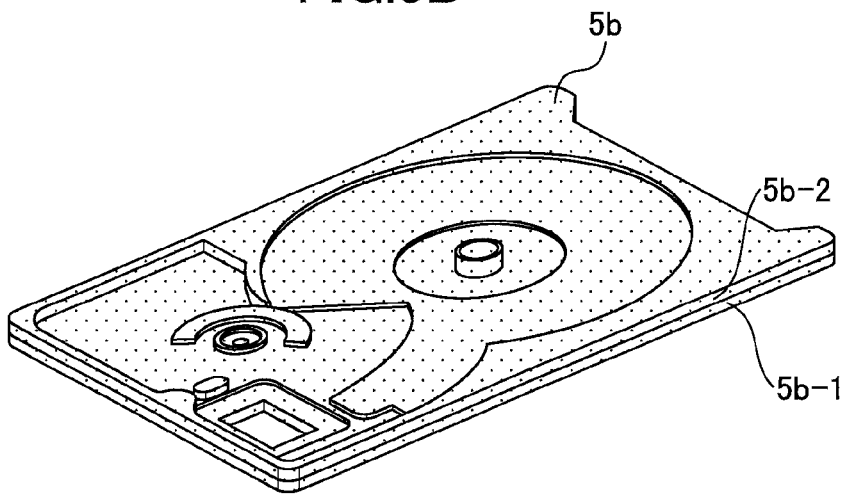

FIGS. 3A and 3B are perspective views illustrating the first base plate forming the base and having a laminated structure and the second base plate forming the base and having the laminated structure, respectively. In FIGS. 3A and 3B, those parts that are the same as those corresponding parts in FIGS. 2A, 2B, and 2C are designated by the same reference numerals, and a description thereof will be omitted.

As illustrated in FIG. 3A, the first base plate 5a, forming the upper half of the base 4, has a laminated structure made up of metal plate parts 5a-1 and 5a-2 and a hardening resin (not illustrated) interposed between the metal plate parts 5a-1 and 5a-2. On the other hand, as illustrated in FIG. 2B, the second base plate 5b, forming the lower half of the base 4, has a laminated structure made up of metal plate parts 5b-1 and 5b-2 and a hardening resin (not illustrated) interposed between the metal plate parts 5b-1 and 5b-2. The base 4 may be formed by bonding the lower metal plate part 5a-1 of the first base plate 5a to the upper metal plate part 5b-2 of the second base plate 5b by a hardening resin (not illustrated). In the examples illustrated in FIGS. 3A and 3B, each of the first and second base plates 5a and 5b has the laminated structure made up of two plate parts and the hardening resin. However, each of the first and second base plates 5a and 5b may have a laminated structure made up of three or more metal plate parts and the hardening resin interposed between two adjacent metal plate parts. Further, only one of the first and second base plates 5a and 5b may have the laminated structure.

Figure 4:
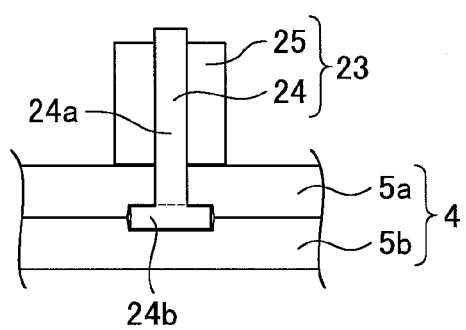
FIG. 4 is a diagram for explaining a method of fixing a crash stopper illustrated in FIGS. 1A and 1B.

FIG. 4 is a diagram for explaining a method of fixing the pin 24. The pin 24 may include a main part 24a, and a flange part 24b extending in a direction approximately perpendicular to a direction in which the main part 24 extends. The pin 24 may be fixed so that the main part 24a penetrates the first base plate 5a and the flange part 24b is interposed between the first base plate 5a and the second base plate 5b. In other words, the pin 24 may be fixed by sandwiching the flange part 24b between the first base plate 5a and the second base plate 5b. This method enables easy fixing of the pin 24, and particularly, the pin 24 may be fixed to extend perpendicularly to the upper surface of the bottom plate part 4a.

Figure 5:
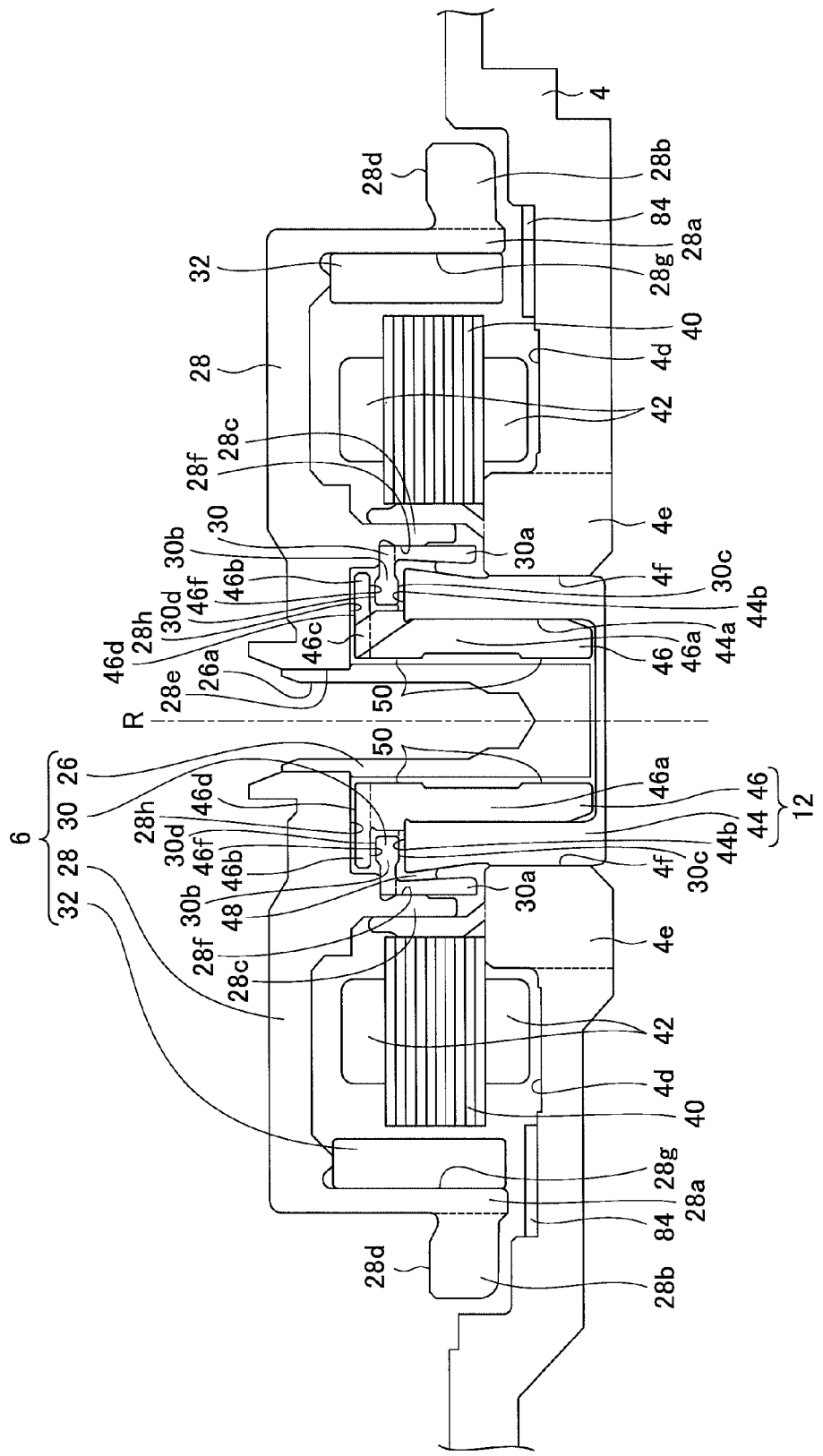
FIG. 5 is a cross sectional view illustrating the rotating device along a line A-A in FIG. 1A.

FIG. 5 is a cross sectional view along a line A-A in FIG. 1A. In FIG. 5, illustration of the magnetic recording disk 8, the clamper 36, and the disk fixing screw 38 will be omitted.

The rotor 6 may further include the hub 28, a shaft 26, a thrust member 30, and a cylindrical magnet 32. The fixed body may further include a laminated (or stacked) core 40, a coil 42, a housing 44, and a sleeve 46. A lubricant 48 may be continuously provided in a part of a gap between the rotor 6 and the fixed body.

The hub 28 may be formed from a soft magnetic steel material such as SUS430F or the like, for example. The hub 28 may be formed by pressing or cutting a steel plate, and may be formed to an approximate cup shape, for example. The steel material preferably used for the hub 28 may be stainless steel DHS1 supplied by Daido Steel Co., Ltd., for example, which is low in outgas and easy to press and cut. In addition, the steel material used for the hub 28 may be stainless steel DHS2 supplied by Daido Steel Co., Ltd., for example, which may be preferable due to its anti-corrosion characteristic. The hub 28 may include a part formed from aluminum and a part formed from a soft magnetic material.

The hub 28 may include a hub projection 28a, a setting part 28b, and a hanging part 28c. The hub projection 28a may fit into the center hole of the magnetic recording disk 8. The setting part 28b may be provided on an outer side than the hub projection 28a along the radial direction (that is, a direction perpendicular to a rotational axis R of the rotor 6. The hanging part 28c may project downwardly from a lower surface of the hub projection 28a and surround the bearing unit 12. The magnetic recording disk 8 may be set on a disk setting surface 28d provided on the upper surface of the setting part 28b.

A hole 26a is provided in an upper end surface of the shaft 26 to receive the disk fixing screw 38 that is screwed into the hole 26a. The upper end of the shaft 26 is fixed in a state in which the upper end of the shaft 26 is press-fit into and bonded to a shaft hole 28e that is provided coaxially to the rotational axis R of the rotor 6 at a center of the hub projection 28a. The shaft 26 may be formed from a steel material such as SUS420J2 or the like, for example, which is harder than the material used to form the hub 28.

The thrust member 30 may include a first cylindrical part 30a, and a second cylindrical part 30b that extends in the radial direction towards the inner side in a ring shape from an upper end of the first cylindrical part 30a. A cross section of the thrust member 30 may have an inverted L-shape. The first cylindrical part 30a may surround the housing 44, and the second cylindrical part 30b may surround the shaft 26 and the sleeve 46. The first cylindrical part 30a may be fixed by being bonded to an inner peripheral surface 28f of the hanging part 28c of the hub 28. In other words, the thrust member 30 may be fixed to the hub 28, and rotate integrally with the hub 28. In this state, a part of the second cylindrical part 30b may rotate in a region between the housing 44 and the sleeve 46. More particularly, the part of the second cylindrical part 30b may rotate in the region between an upper surface 44b of the housing 44 and a lower surface 46f of a flange part 46b of the sleeve 46.

The cylindrical magnet 32 may be fixed by being bonded to a cylindrical inner peripheral surface 28g of the hub 28 having the approximate cup shape. The cylindrical magnet 32 may be formed from a rare earth magnetic material, a ferrite magnetic material, or the like, for example, and oppose twelve (12) salient poles of the laminated core 40 along the radial direction. The cylindrical magnet 32 may be provided with sixteen (16) driving magnetic poles along a circumferential direction thereof (that is, a tangential direction that is tangent to a circle having the rotational axis R as its center, and wherein the circle is perpendicular to the rotational axis R. A surface layer may be formed on the surface of the cylindrical magnet 32 by electro-coating, spray coating, or the like, for example. The provision of this surface layer may suppress corrosion, for example.

The laminated core 40 may include a cylindrical part and twelve (12) salient poles extending from the cylindrical part towards the outer side along the radial direction. The laminated core 40 may be fixed on the side of an upper surface 4d of the base 4. The laminated core 40 may be formed by laminating ten (10) thin magnetic steel plates each having a thickness of 0.2 mm, and crimping the thin magnetic steel plates in order to integrally form the laminated core 40. A surface layer may be formed on the surface of the laminated core 40 by electro-coating, powder coating, or the like, for example. The provision of this surface layer may suppress a short-circuit between the laminated core 40 and the coil 42, for example. The coil 42 may be wound on each salient pole of the laminated core 40. A driving magnetic flux is generated along the salient poles when a 3-phase driving current having an approximately sinusoidal waveform flows to the coil 42.

A ring-shaped member 4e having the rotational axis R of the rotor 6 as its center is provided on the upper surface 4d of the base 4. A penetration hole 4f may be formed in the ring-shaped member 4e along the rotational axis R of the rotor 6. The laminated core 40 may be press fit or inserted with a gap into the outer peripheral surface of the ring-shaped member 4e, and fixed by being bonded to the outer peripheral surface of the ring-shaped member 4e. The ring-shaped member 4e will be described later in conjunction with FIG. 6 in more detail.

A magnetic ring 84 is arranged in a part of the upper surface 4d of the base 4 opposing the ring-shaped magnet 32 along an axial direction. The magnetic ring 84 may be formed from a magnetic steel plate, for example, into a ring shape that is thin along the axial direction. The magnetic ring 84 may be fixed by being bonded to the upper surface 4d of the base 4, for example, so that an inner periphery of the magnetic ring 84 is coaxial to the rotational axis R. The magnetic ring 84 may be fixed to the base 4 by crimping a side surface of the magnetic ring 84. Magnetic attraction acts to attract the cylindrical magnet 32 towards the side of the magnetic ring 84, that is, towards the side of the base 4, by the provision of the magnetic ring 84.

The bearing unit 12 may include the housing 44 and the sleeve 46, and rotatably support the rotor 6 to freely rotate with respect to the base 4. The housing 44 may have a cup shape integrally having a cylindrical part and a bottom part. In other words, the housing 44 may include a recess 44a that opens upwards about the rotational axis R as its center. The housing 44 may be fixed by being bonded to the ring-shaped member 4e within the penetration hole 4f with the bottom part of the housing 44 facing down.

The fixed body may include the flange part 46b extending outwardly in the radial direction in the region on the outer peripheral side of the shaft 26, and be fixedly provided with respect to the base 4. More particularly, the sleeve 46 may include a shaft support part 46a that is a cylindrical member and supports the shaft 26, and the flange part 46b projecting in the radial direction towards the outer side from an upper end of the shaft support part 46a. The sleeve 46 may be fixed by being inserted into and bonded to the recess 44a of the housing 44. The flange part 46b may cooperate with the thrust member 30 and restrict movement of the rotor 6 in the axial direction. The sleeve 46 may include a penetration hole 46c. The penetration hole 46c will be described later in conjunction with FIG. 7 in more detail.

The lubricant may be provided in a space between the bearing unit 12 which is a part of the fixed body, and the shaft 26, the hub 28, and the thrust member 30 which are parts of the rotor 6.

A pair of herringbone-shaped radial dynamic pressure grooves 50 that are separated in the up-and-down direction are formed in the inner peripheral surface of the sleeve 46. The pair of herringbone-shaped radial dynamic pressure grooves 50 may be formed in the shaft 26. The radial dynamic pressure grooves 50 may be formed in a spiral shape.

A first thrust opposing part may be provided in a region where the second cylindrical part 30b and the housing 44 oppose each other along the axial direction. More particularly, the first thrust opposing part may be provided in a gap where a lower surface 30c of the second cylindrical part 30b and the upper surface 44b of the housing 44 oppose each other along the axial direction. A second thrust opposing part may be provided in a region where the second cylindrical part 30b and the flange part 46b oppose each other along the axial direction. More particularly, the second thrust opposing part may be provided in a gap where an upper surface 30d of the second cylindrical part 30b and the lower surface 46f of the flange part 46b oppose each other along the axial direction.

A herringbone-shaped first thrust dynamic pressure groove (not illustrated) may be formed in the lower surface 30c of the second cylindrical part. The first thrust dynamic pressure groove may be formed in the upper surface 44b of the housing 44. A herringbone-shaped second thrust dynamic pressure groove (not illustrated) may be formed in at least one of a surface 28h of the hub 28 opposing the upper surface 46d of the flange part 46b, the upper surface 46d of the flange part 46b opposing the hub 28, the lower surface 46f of the flange part 46b opposing the upper surface 30d of the second cylindrical part 30b, and the upper surface 30d of the second cylindrical part 30b opposing the lower surface 46f of the flange part 46b. When the rotor 6 rotates, the rotor 6 may be supported in both the radial direction and the axial direction by the dynamic pressure generated in the lubricant 48 by the first and second dynamic pressure grooves.

Figure 6:
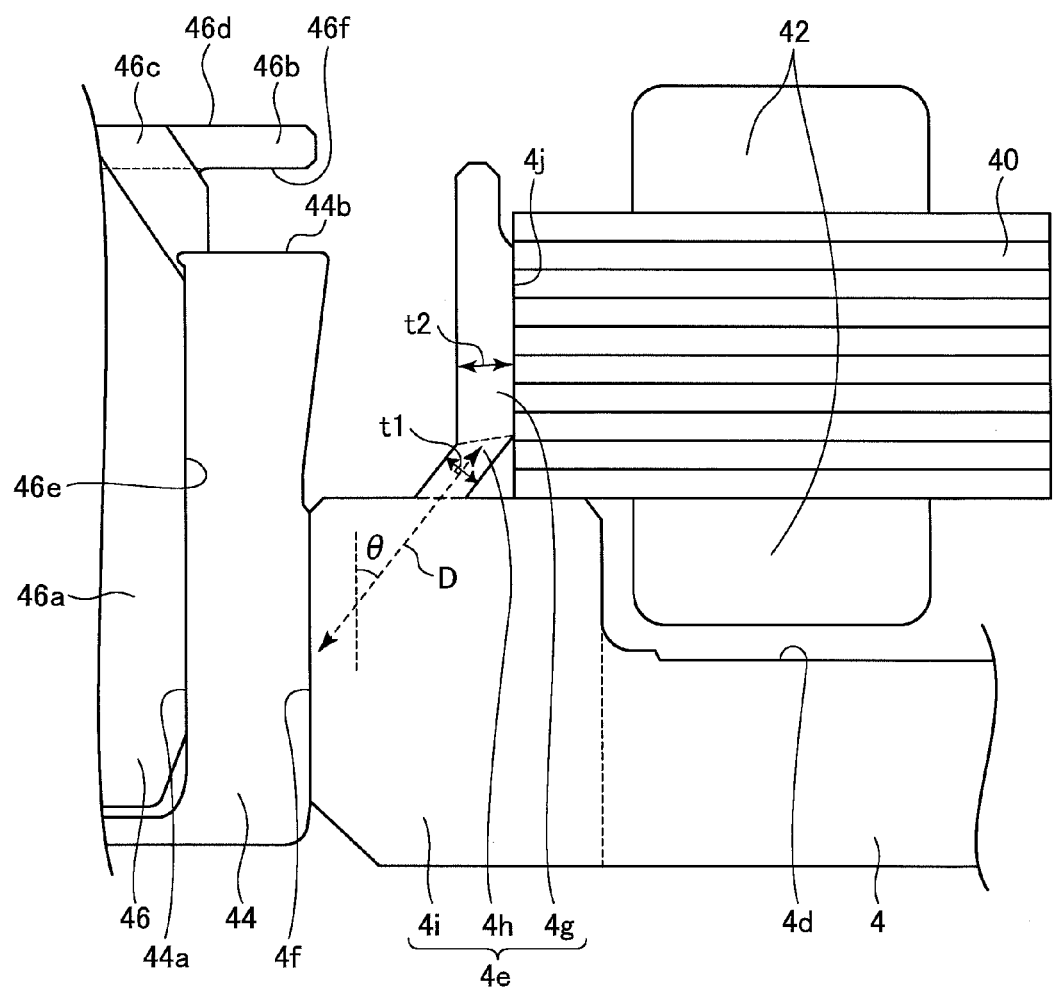
FIG. 6 is a cross sectional view, on an enlarged scale, illustrating a periphery of a ring-shaped member illustrated in FIG. 5.

FIG. 6 is a cross sectional view, on an enlarged scale, illustrating a periphery of the ring-shaped member 4e. The ring-shaped member 4e may include a core holding part 4g, a sloping part 4h, and a support part 4i. The core holding part 4g extends along the axial direction, and the laminated core 40 may be press fit or inserted with a gap into an outer peripheral surface 4j of the ring-shaped member 4e, and fixed by being bonded to the outer peripheral surface 4j of the ring-shaped member 4e. As described above, the penetration hole 4f is formed in the support part 4i, and the housing 44 may be fixed by being bonded to the ring-shaped member 4e within the penetration hole 4f. The sleeve 46 may be inserted into the recess 44a of the housing 44, and fixed by being bonded to the housing 44. In other words, the support part 4i fixedly supports the sleeve 46 via the housing 44.

The sloping part 4h may extend linearly from a lower end of the core holding part 4g down to an upper end of the support part 4i. More particularly, the sloping part 4h may extend linearly by being inclined by an angle θ with respect to the direction of the rotational axis R. A gap is formed between the sloping part 4h and the laminated core 40, and the laminated core 40 is supported on the support part 4i. A thickness t1 of the sloping part 4h in a direction perpendicular to its extending direction D may be smaller than a thickness t2 of the core holding part 4g along the radial direction. More particularly, the thickness t1 of the sloping part 4h may be set to be 0.16 times to 0.87 times the thickness t2 of the core holding part 4g. Because the thickness t1 may be relatively small, vibration originating from the laminated core 40 may be absorbed by the sloping part 4h, in order to reduce the vibration propagating to the support part 4i and thus to the entire base 4.

Figure 7:
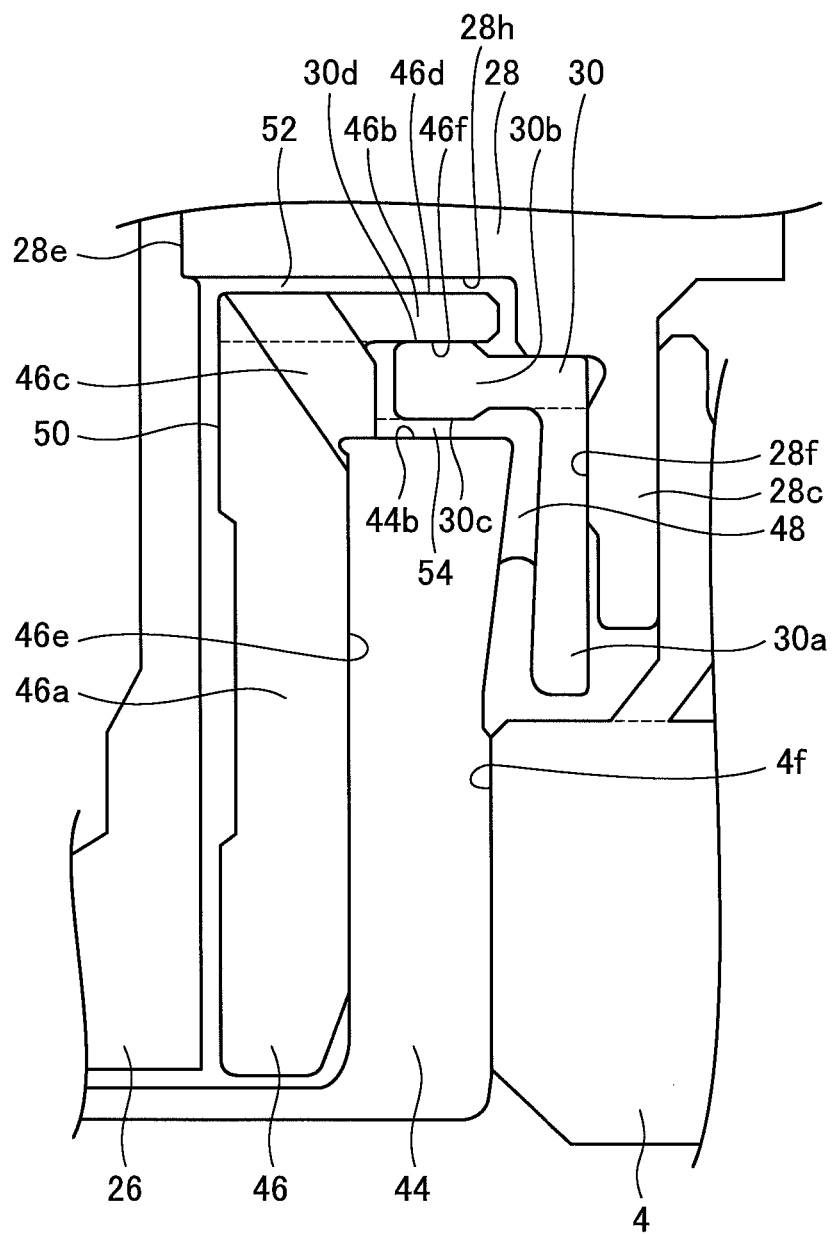
FIG. 7 is a cross sectional view, on an enlarged scale, illustrating an upper end of a sleeve and a periphery of a thrust member illustrated in FIG. 5.

FIG. 7 is a cross sectional view, on an enlarged scale, illustrating an upper end of the sleeve 46 and a periphery of the thrust member 30. FIG. 7 illustrates an example in which the thrust member 30 is adjacent to the flange part 46b of the sleeve 46 in the direction of the rotational axis R. The penetration hole 46c that linearly penetrates the upper surface 46d of the flange part 46b and a side surface 46e of the shaft support part 46a opposing the thrust member 30 along the radial direction may be formed in the upper end of the sleeve 46. The penetration hole 46c may essentially be a shortest passage connecting a region 52 between the hub 28 and the flange part 46b and a region 54 facing the lower surface 30c of the second cylindrical part 30b of the thrust member 30.

A case may be considered in which the rotating device 1 in this embodiment, provided with the penetration hole 46c as illustrated in FIG. 7, falls to the ground or the like in a state in which the hub 29 faces down. First, due to inertial force, the sleeve 46 and the housing 44 move in the direction towards the hub 28, and the upper surface 44b of the housing 44 collides with the thrust member 30. As a reaction to this collision, the sleeve 46 and the housing 44 move in the direction away from the hub 28 so as to separate from the hub 28, and the lower surface 46f of the flange part 46b collides with the thrust member 30 as illustrated in FIG. 7. In this state, the region 54 spreads in the direction of the rotational axis R, however, the lubricant 48 flows into the region from the region 52 via the penetration hole 46c, and thus, the pressure of the lubricant 48 may be averaged within a relatively short time. For this reason, the pressure in the region 54 uneasily decreases. Accordingly, when the sleeve 46 and the housing 44 again move in the direction towards the hub 28 due to the reaction of the collision between the flange part 46b and the thrust member 30, the housing 44 receives a relatively large pressure drag from the lubricant 48 compared to a case in which no penetration hole 46c is provided. In other words, the up-and-down movement of the sleeve 46 and the housing 44 with respect to the thrust member 30 may be suppressed. For this reason, the collision between the thrust member 30 and the housing 44 may be relieved. In addition, compared to the case in which no penetration hole 46c is provided, the number of times the flange part 46b and the housing 44 repeat collisions with the thrust member 30 may be reduced.

Next, a description will be given of the operation of the rotating device 1 having the configuration described above. The 3-phase driving current may be supplied to the coil 42 in order to rotate the magnetic recording disk 8. When the driving current flows through the coil 42, the magnetic flux may be generated along the twelve (12) salient poles. A torque may be applied to the cylindrical magnet 32 due to this magnetic flux, to thereby rotate the rotor 6 and the magnetic recording disk 8 that is fitted onto the rotor 6. At the same time, the voice coil motor 16 may swing the swing arm 14 so that the recording and reproducing head 13 moves within the swing range on the magnetic recording disk 8. The recording and reproducing head 13 may convert magnetic data recorded on the magnetic recording disk 8 into an electrical signal and supply the electrical signal to the control circuit board (not illustrated). In addition, the recording and reproducing head 13 may convert data in the form of the electrical signal supplied from the control circuit board into magnetic data to be written on the magnetic recording disk 8.

According to the rotating device 1 in this embodiment, when the thrust member 30 becomes adjacent to the lower surface 46f of the flange part 46b, the lubricant 48 existing in the region 52 between the hub 28 and the flange part 46b may flow into the region facing the lower surface 30c of the second cylindrical part 30b of the thrust member 30, and the pressure of the lubricant 48 may be averaged immediately. For this reason, even in a case in which the thrust member 30 becomes adjacent to the lower surface 46f of the flange part 46b, the pressure in the region 54 may uneasily decreased. Accordingly, when the housing 44 moves in the direction towards the thrust member 30, the housing 44 may receive a relatively large pressure drag. Consequently, the collision between the housing 44 and the thrust member 30 may be relieved, and the number of times the flange part 46b and the housing 44 repeat collisions with the thrust member 30 may be reduced. As a result, the data read error and/or the data write error may be reduced.

Figure 8A:
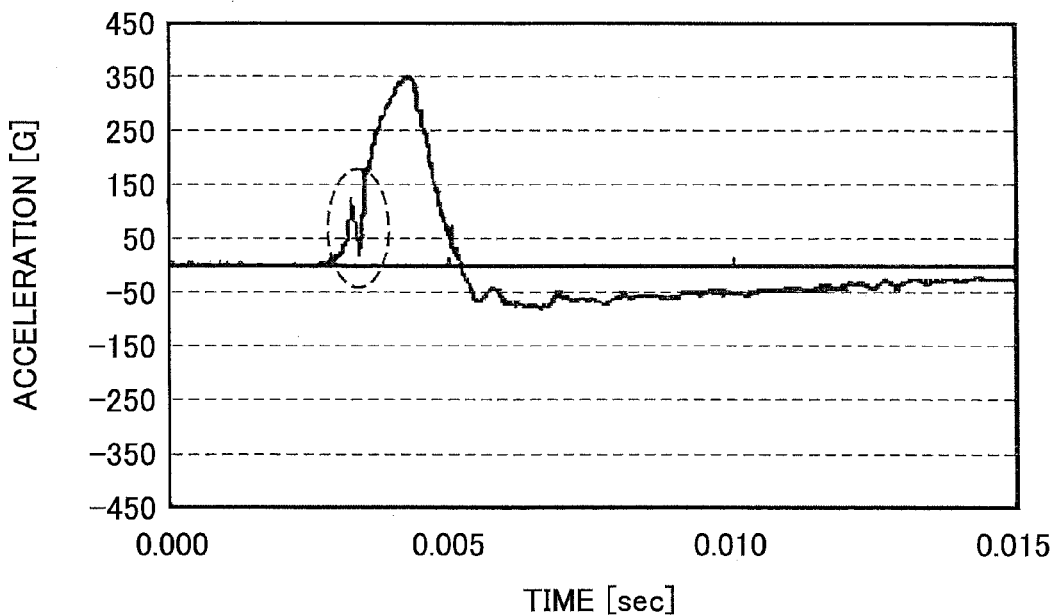
FIGS. 8A and 8B are diagrams illustrating an acceleration waveform in a case in which shock is applied to the rotating device of the embodiment and an acceleration waveform in a case in which shock is applied to the rotating device of the embodiment with a penetration hole thereof blocked, respectively.
Figure 8B:
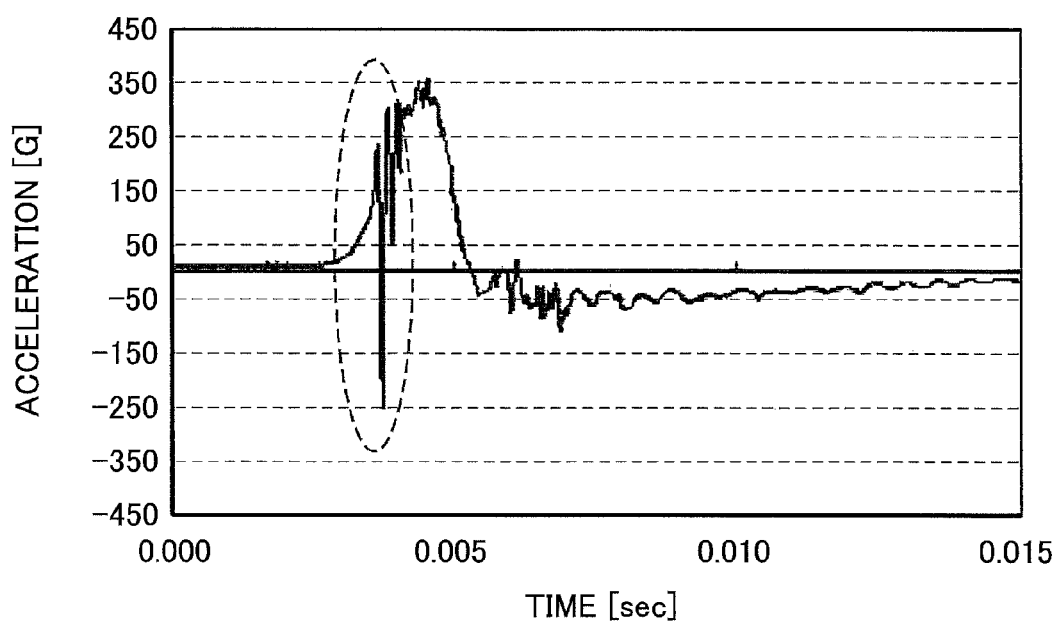

The present inventors conducted experiments to confirm the effects of reducing the data read error and/or the data write error by the provision of the penetration hole 46c in the sleeve 46. More particularly, the rotating device 1 in an operating state thereof was dropped onto a test bench (not illustrated) in a state in which the hub 28 faces down, and acceleration was measured by an acceleration sensor (not illustrated) that is mounted on the base 4. FIG. 8A illustrates an acceleration waveform in a case in which shock is applied to the rotating device 1 of the embodiment, and FIG. 8B illustrates an acceleration waveform in a case in which shock is applied to the rotating device 1 of the embodiment, identical to that used for the measurement of FIG. 8A, but with the penetration hole 46c thereof blocked. In FIGS. 8A and 8B, the abscissa indicates the time in seconds (sec) before and after the collision, and the ordinate indicates the acceleration in G. As illustrated in FIGS. 8A and 8B, an acceleration in accordance with the applied shock of half-sinusoidal wave was observed for each of the rotating devices 1 tested. In FIG. 8B, a relatively large spike noise is generated in a part surrounded by a dotted line. It may be regarded that this spike noise is caused by the repeated collisions of the flange part 46b and the housing 44 with respect to the thrust member 30. On the other hand, in FIG. 8A, the amount of spike noise is less and the spike noise is smaller when compared to FIG. 8B. From the results of these experiments, it may be confirmed that the number of times the flange part 46b and the housing 44 repeat collisions with the thrust member 30 due to the fall or the like of the rotating device 1 may be reduced by the provision of the penetration hole 46c in the sleeve 46.

Figure 9:
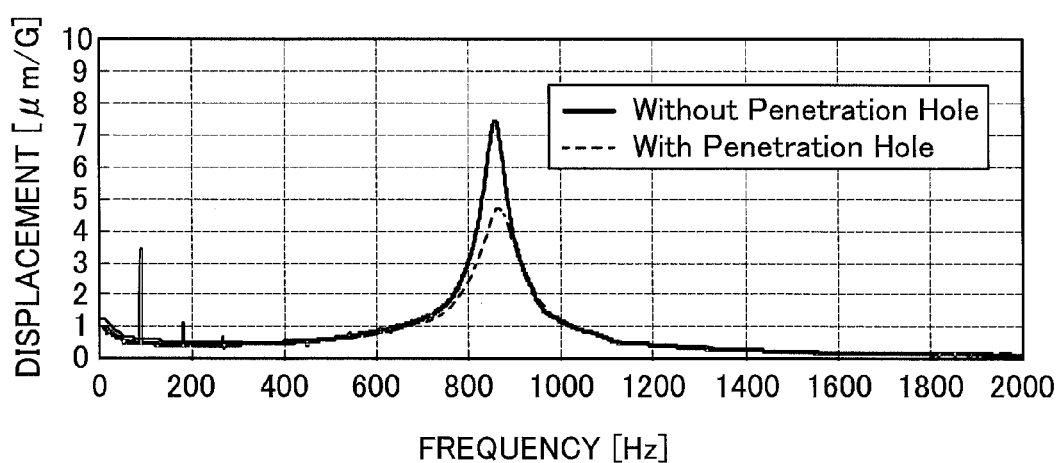
FIG. 9 is a diagram illustrating a displacement of a magnetic recording disk when vibrations of various frequencies are applied to the rotating device.

The present inventors also conducted other experiments in order to confirm the effects of reducing the data read error and/or the data write error. More particularly, the rotating device 1 in the operating state thereof was placed on a vibrating bench (not illustrated) in a state in which the hub 28 faces up, and vibrations of various frequencies from 10 Hz to 2000 Hz were applied on the rotating device 1 in order to measure a displacement of the magnetic recording disk 8 by a displacement gauge (not illustrated). FIG. 9 illustrates the results of measuring the displacement of the magnetic recording disk 8 for the rotating device 1 in this embodiment provided with the penetration hole 46c as indicated by a solid line, and for the rotating device 1 without the penetration hole 46c as indicated by a dotted line. In FIG. 9, the abscissa indicates the frequency in Hz, and the ordinate indicates the displacement in μm/G. As illustrated in FIG. 9, the magnetic recording disk 8 resonates when the vibration of 700 Hz to 900 Hz is applied to the rotating devices 1 with and without the penetration hole 46c. However, in the case of the rotating device 1 with the penetration hole 46c, it was confirmed that the displacement at the resonance is smaller when compared to the rotating device 1 without the penetration hole 46c. It may be regarded that, when the penetration hole 46c is provided in the sleeve 46, the up-and-down movement of the thrust member 30 and the hub 28 in the direction of the rotational axis R with respect to the fixed body including the housing 44 and the sleeve 46 may be suppressed when the vibration is applied to the rotating device 1, to thereby suppress the up-and-down movement of the magnetic recording disk 8 in the direction of the rotational axis R, which results in the smaller displacement at the resonance when the penetration hole 46c is provided.

The configuration and operation of the rotating device in this embodiment are described above by way of an example. The present invention is not limited to the above embodiment and example, and various variations and modifications may be made without departing from the scope of the present invention. It may be understood by those skilled in the art that such variations and modifications also fall within the scope of the present invention.

In the described embodiment, the rotating device is the so-called outer rotor type in which the cylindrical magnet is located on the outer side of the laminated core. However, the present invention is not limited to the outer rotor type rotating device. For example, the technical concept of the described embodiment may be applied to the so-called inner rotor type rotating device in which the cylindrical magnet is located on the inner side of the laminated core.

In the described embodiment, the bearing unit 12 is mounted directly on the base 4. However, the present invention is not limited to such a bearing configuration. For example, a brushless motor including a rotor, a bearing unit, a laminated core, a coil, and a base may be formed separately, and this brushless motor may be mounted on the base.

In the described embodiment, the base 4 integrally includes the bottom plate part 4a and the outer peripheral wall part 4b. However, the present invention is not limited to such a base configuration. For example, the bottom part and the outer peripheral wall part may be formed separately, and the bottom part and the outer peripheral wall part may be connected thereafter to form the base. For example, the bottom part may be connected after separately forming an inner side member and an outer side member that surrounds the inner side member. In this case, the inner side member may be formed from a material having a Young's modulus larger than that of a material forming the outer side member. As a result, the degree of freedom of design may be improved.

In the described embodiment, the first base plate 5a and the second base plate 5b are bonded by the hardening resin. However, the present invention is not limited to such a base configuration. For example, the first base plate 5a and the second base plate 5b may be connected by crimping, a combination of the hardening resin and the crimping, or the like. As a result, the degree of freedom of design may be improved.

The described embodiment uses the laminated core 40, however, the core may have a configuration other than the laminated configuration. In addition, although the laminated core 40 of the described embodiment includes twelve (12) salient poles, the number of salient poles is of course not limited to twelve (12), and may be six (6) or nine (9), for example. In this case, a process of forming the coil 42 may be simplified. The number of salient poles of the laminated core 40 may be an integral multiple of three (3) in a range of fifteen (15) to thirty-six (36). In this case, the number of turns of the coil 42 may be increased. These numbers of salient poles of the laminated core 40 are merely examples, and the number of salient poles is not limited to the numbers mentioned above.

In the described embodiment, the laminated core 40 is formed by laminating ten (10) thin magnetic steel plates having a thickness of 0.2 mm. However, the present invention is not limited to such a laminated core configuration. For example, the laminated core 40 may be formed by laminating a number of magnetic steel plates in a range of two (2) to twenty (20), having a thickness in a range of 0.1 mm to 0.8 mm. The above ranges for the number of magnetic steel plates and the thickness of the magnetic steel plates are merely examples, and the number of magnetic steel plates and the thickness of the magnetic steel plates may be appropriately selected in other ranges.

In the described embodiment, the number of driving magnetic poles of the cylindrical magnet 32 is sixteen (16), however, the present invention is not limited to such a magnetic pole configuration. For example, the number of driving magnetic poles of the cylindrical magnet 32 may be an even number in a range of eight (8) to fourteen (14). In this case, the magnetization may be facilitated. The number of driving magnetic poles of the cylindrical magnet 32 may be an even number in a range of eighteen (18) to twenty-four (24), for example. In this case, the number of salient poles of the laminated core 40 may be increased, to increase the number of turns of the coil 42. The above ranges for the number of driving magnetic poles are merely examples, and the number of driving magnetic poles may be appropriately selected in other ranges.

In the described embodiment, the penetration hole 46c is linearly provided. In other words, the penetration hole 46c extends linearly. However, the penetration hole 46c may have other shapes, such as a curved shape, for example. As a result, the degree of freedom of design may be improved.

Figure 10:
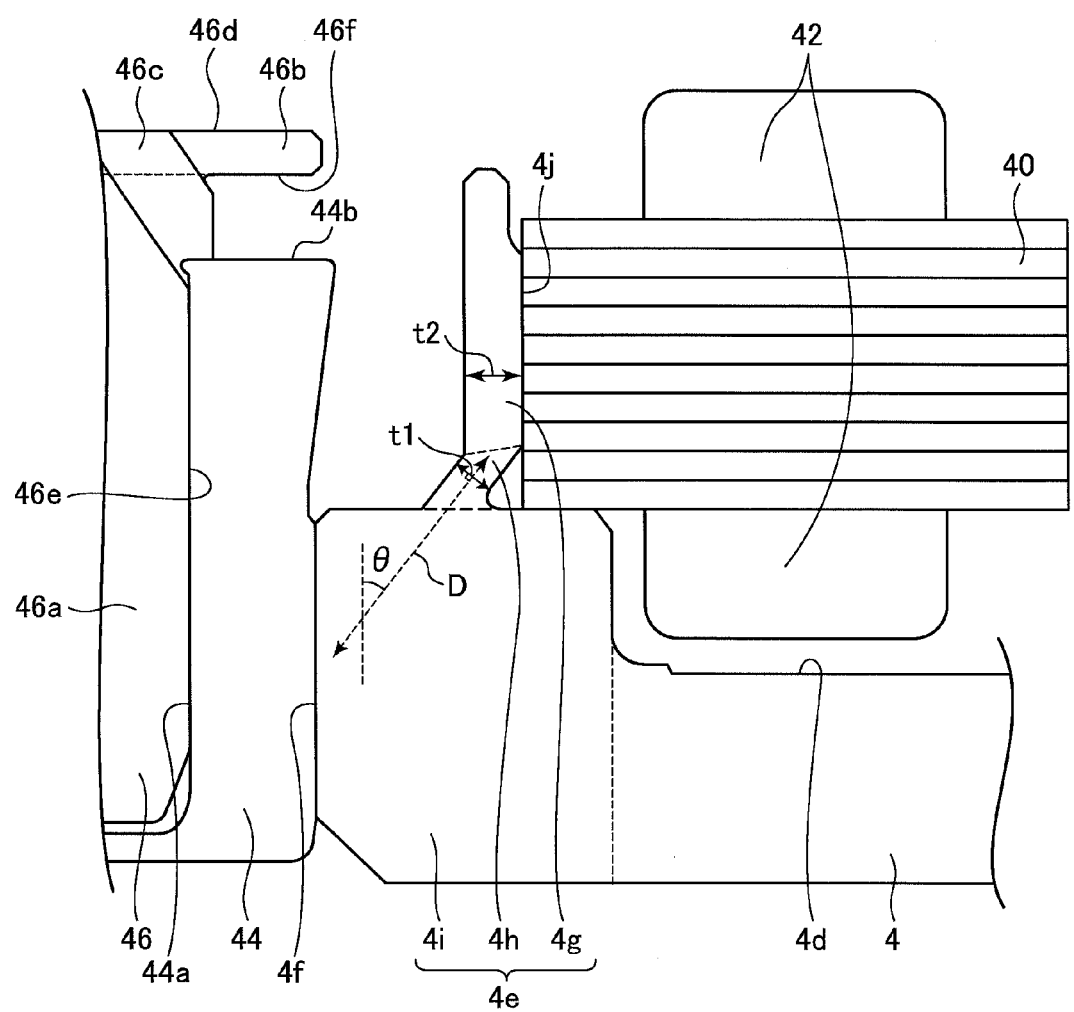
FIG. 10 is a cross sectional view, on an enlarged scale, illustrating the periphery of the ring-shaped member of the rotating device in a modification of the embodiment.

In the described embodiment, the side surface of the sloping part 4h of the ring-shaped member 4e extends linearly. However, the present invention is not limited to such a linear configuration of the side surface of the sloping part 4h. FIG. 10 is a cross sectional view, on an enlarged scale, illustrating the periphery of the ring-shaped member 4e of a rotating device 200 in a modification of the embodiment. As illustrated in FIG. 10, the side surface on the lower end side of the sloping part 4h may have a rounded shape. As a result, a degree of freedom of forming the sloping part 4h may be improved.

Next, a description will be given of examples of dimensions of each part of the embodiment described above. The embodiment may preferably used in the so-called thin type 2.5-inch hard disk drive and 3.5-inch hard disk drive that have a thickness of 12.7 mm or less along the axial direction. In the case of a 2.5-inch hard disk drive having the thickness of approximately 9 mm along the axial direction, for example, the thickness of the cylindrical magnet 32 along the axial direction may be selected in a range of 3.0 mm to 4.2 mm, and the thickness of the laminated core 40 along the axial direction may be selected in a range of 1.4 mm to 3.2 mm. In the case of a 2.5-inch hard disk drive having the thickness of approximately 7 mm along the axial direction, for example, the thickness of the cylindrical magnet 32 along the axial direction may be selected in a range of 2.7 mm to 3.9 mm, and the thickness of the laminated core 40 along the axial direction may be selected in a range of 1.2 mm to 3.0 mm. In the case of a 2.5-inch hard disk drive having the thickness of approximately 5 mm along the axial direction, for example, the thickness of the cylindrical magnet 32 along the axial direction may be selected in a range of 1.8 mm to 3.0 mm, and the thickness of the laminated core 40 along the axial direction may be selected in a range of 0.6 mm to 2.8 mm. In the case of a 2.5-inch hard disk drive having the thickness less than approximately 5 mm along the axial direction, for example, the thickness of the cylindrical magnet 32 along the axial direction may be selected in a range of 1.6 mm to 2.8 mm, and the thickness of the laminated core 40 along the axial direction may be selected in a range of 0.4 mm to 2.6 mm. The above ranges for the thickness of the ring-shaped magnet 32 and the thickness of the laminated core 40 are merely examples, and the thicknesses may be appropriately selected in other ranges.

According to the embodiments and modifications, it is possible to provide a rotating device that may reduce undesirable effects of shock and vibration.

Although the embodiments of the present invention have been described in detail, it should be understood that the various changes, substitutions, and alterations could be made hereto without departing from the spirit and scope of the invention.

What is claimed is:

1. A rotating device comprising:
a rotor rotatable about a rotational axis and including a hub configured to receive a recording disk; and
a fixed body, including a base that fixedly supports a bearing unit, configured to rotatably support the rotor via the bearing unit,
wherein the fixed body includes
a core having a cylindrical part and a plurality of salient poles extending in a radial direction from the cylindrical part; and
a ring-shaped member having a core holding part that has an outer peripheral surface having the core fixed thereto, a sloping part extending in a direction inclined by a predetermined angle with respect to the rotational axis of the rotor from a side of the core holding part farther away from the hub, and a support part extending from a side of the sloping part farther away from the hub,
wherein the rotor includes a magnet fixedly supported on a surface of the hub on a side of the salient poles, and
wherein the sloping part has a thickness smaller than that of the core holding part.

2. The rotating device as claimed in claim 1, wherein the thickness of the sloping part is in a range of 0.16 times to 0.87 times the thickness of the core holding part.

3. The rotating device as claimed in claim 1, wherein the core is fixed to the core holding part in a state in which an inner peripheral surface of the core is press fit or inserted and bonded to an outer peripheral surface of the core holding part.

4. The rotating device as claimed in claim 1, wherein the sloping part extends linearly from a lower end of the core holding part to an upper end of the support part.

5. The rotating device as claimed in claim 1, wherein the core is formed by a laminated core.

6. The rotating device as claimed in claim 1, wherein a gap is formed between the sloping part and the core, and the core is supported on the support part.

7. The rotating device as claimed in claim 1, wherein the base includes a first base plate having an opening with a predetermined shape, and a second base plate bonded to the first base plate.

8. The rotating device as claimed in claim 7, wherein the base includes a embossed surface formed by pressing at least one of the first and second base plates.

9. The rotating device as claimed in claim 7, further comprising:
a hardening resin interposed between the first base plate and the second base plate.

10. The rotating device as claimed in claim 7, wherein at least one of the first and second base plates has a laminated structure made up of two or more layers, including metal sheets and a hardening resin interposed between the metal sheets.

11. The rotating device as claimed in claim 7, further comprising:
a pin penetrating the first base plate,
wherein the pin includes a flange part extending in a direction approximately perpendicular to a direction in which the pin extends, and
wherein the flange part is sandwiched between the first and second base plates.

12. The rotating device as claimed in claim 1, wherein the bearing unit includes
a shaft having one end thereof fixed to the hub;
a thrust member configured to rotate integrally with the hub;
a sleeve having a shaft support part surrounding the other end of the shaft and rotatably supporting the shaft, and a flange part projecting towards an outer side in the radial direction from an end part of the shaft support part on the side of the hub; and
a lubricant provided within a gap between the rotor and the fixed body,
wherein a part of the thrust member rotates in a region facing a surface of the flange part on a side farther away from the hub,
wherein a groove to generate a thrust dynamic pressure in the lubricant is provided in at least one of the surface of the hub opposing the flange part, the surface of the flange part opposing the hub, the surface of the flange part opposing the thrust member, and the surface of the thrust member opposing the flange part, and
wherein the sleeve includes a first passage to flow the lubricant existing between the hub and the flange part to the region facing the surface of the thrust member on the side farther away from the hub when the thrust member becomes adjacent to the flange part, separately from a second passage provided between the flange part and the thrust member.

13. The rotating device as claimed in claim 12, wherein the first passage includes a penetration hole penetrating a surface opposing the hub of the flange part in the axial direction, and a surface opposing the thrust member of the shaft support part in the radial direction.

14. The rotating device as claimed in claim 12, wherein the first passage extends linearly with an inclination with respect to the rotational axis of the rotor.

* * * * *